United States Patent
Kuo

(10) Patent No.: US 10,775,652 B2
(45) Date of Patent: Sep. 15, 2020

(54) DRIVING METHOD OF PRIVACY APPARATUS COMPRISING LIGHT-TRANSMISSIVE LAYER HAVING A PLURALITY OF TRENCHES DISPOSED WITH A PLURALITY OF ELECTRICALLY SWITCHABLE OPTICAL STRUCTURES AND PRIVACY APPARATUS

(71) Applicant: Acer Incorporated, New Taipei (TW)

(72) Inventor: Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/784,264

(22) Filed: Feb. 7, 2020

(65) Prior Publication Data

US 2020/0174292 A1    Jun. 4, 2020

Related U.S. Application Data

(62) Division of application No. 15/713,723, filed on Sep. 25, 2017, now Pat. No. 10,606,105.

(30) Foreign Application Priority Data

Jul. 25, 2017   (TW) .............................. 106124847 A

(51) Int. Cl.
    *G02F 1/13*      (2006.01)
    *G02F 1/1334*    (2006.01)
    (Continued)

(52) U.S. Cl.
    CPC ......... *G02F 1/1323* (2013.01); *G02B 27/022* (2013.01); *G02F 1/1334* (2013.01);
    (Continued)

(58) Field of Classification Search
    CPC ............... G02F 1/1323; G02F 2203/62; G02F 2201/44; G02F 2203/24; G02B 27/022
    See application file for complete search history.

(56) References Cited

U.S. PATENT DOCUMENTS 8,382,299 B2 *   2/2013   Mimura ................. G02B 5/003
                                                            359/602
2013/0162924 A1 * 6/2013   Sahouani .............. G02F 1/1323
                                                            349/41
(Continued)

FOREIGN PATENT DOCUMENTS

JP           2006091871 A   *   4/2006   ........... G02F 1/1323

*Primary Examiner* — Paul C Lee
(74) *Attorney, Agent, or Firm* — JCIPRNET

(57) ABSTRACT

A driving method of a privacy apparatus is provided. The privacy apparatus includes a light-transmissive layer and a plurality of electrically switchable optical structures. The light-transmissive layer includes a plurality of trenches not crossing over each other. The electrically switchable optical structures are respectively disposed in the trenches. An extension direction of each of the trenches is inclined relative to an edge of the privacy apparatus on a plane of the privacy apparatus. The driving method of the privacy apparatus includes applying a driving electric field to a part of the trenches to render a part of the electrically switchable optical structures light-transmissive, and maintaining the other part of the electrically switchable optical structures opaque. Besides, a privacy apparatus is also provided.

9 Claims, 12 Drawing Sheets

(51) Int. Cl.
*G02F 1/1347* (2006.01)
*G02F 1/1337* (2006.01)
*G02B 27/02* (2006.01)

(52) U.S. Cl.
CPC ...... *G02F 1/1347* (2013.01); *G02F 1/133711* (2013.01); *G02F 2201/44* (2013.01); *G02F 2203/62* (2013.01)

(56) References Cited

U.S. PATENT DOCUMENTS

| | | | |
|---|---|---|---|
| 2014/0232960 A1* | 8/2014 | Schwartz | B32B 3/30 349/12 |
| 2017/0219859 A1* | 8/2017 | Christophy | G02B 6/005 |
| 2017/0261781 A1* | 9/2017 | Lee | G02F 1/133345 |

* cited by examiner

DRIVING METHOD OF PRIVACY APPARATUS COMPRISING LIGHT-TRANSMISSIVE LAYER HAVING A PLURALITY OF TRENCHES DISPOSED WITH A PLURALITY OF ELECTRICALLY SWITCHABLE OPTICAL STRUCTURES AND PRIVACY APPARATUS

CROSS-REFERENCE TO RELATED APPLICATION

This application is a divisional application of and claims the priority of U.S. application Ser. No. 15/713,723, filed on Sep. 25, 2017, now allowed, which claims the priority benefit of Taiwan application serial no. 106124847, filed on Jul. 25, 2017. The entirety of each of the above-mentioned patent applications is hereby incorporated by reference herein and made a part of this specification.

BACKGROUND OF THE INVENTION

Field of the Invention

The invention relates to a driving method of an apparatus and an apparatus. More particularly, the invention relates to a driving method of a privacy apparatus and a privacy apparatus.

Description of Related Art

In relevant research on displays in recent years, the privacy function of displays has drawn more and more attention. Since people seek to protect their personal privacy when using relevant products, there is an increasing demand for the displays equipped with the privacy function. Also, the application of common privacy displays has been extended from notebook computers and liquid crystal monitors to portable consumer audio and video products, such as mobile phones, tablets and so on. To realize the privacy function, a common privacy design is to attach a privacy film to the front of a display. The privacy film may have a blinds shaped microstructure for shielding large-angle display light, so that the display can normally display an image at a normal viewing angle or within a certain viewing angle range around the normal viewing angle, while the display cannot clearly display an image at a larger oblique viewing angle.

However, due to the design of period of the microstructure in the privacy film, under some circumstances, the microstructure in the privacy film may interfere with the period of display pixels of the display, with the result that an effect of moiré is caused on a display screen of the display. A user usually has to choose and buy the privacy film according to the models (or resolutions) of different displays. A privacy angle of the privacy film is usually fixed and unadjustable, which reduces use convenience.

SUMMARY OF THE INVENTION

The invention provides a driving method of a privacy apparatus, in which a switchable privacy function is provided.

The invention provides a privacy apparatus having an easy-to-use function and a good display effect.

An embodiment of the invention directs to a driving method of a privacy apparatus, wherein the privacy apparatus includes a light-transmissive layer and a plurality of electrically switchable optical structures. The light-transmissive layer includes a plurality of trenches not crossing over each other. The electrically switchable optical structures are respectively disposed in the trenches. An extension direction of each of the plurality of trenches is inclined relative to an edge of the privacy apparatus on a plane of the privacy apparatus. The driving method includes applying a driving electric field to a part of the trenches to render a part of the electrically switchable optical structures light-transmissive, and maintaining the other part of the electrically switchable optical structures opaque.

According to an embodiment of the invention, in a first mode, the other part of the electrically switchable optical structures are separated from each other by a first interval; in a second mode, the other part of the electrically switchable optical structures are separated from each other by a second interval, wherein the first interval is different from the second interval.

According to an embodiment of the invention, the electrically switchable optical structure includes a first electrically switchable optical structure and a second electrically switchable optical structure that are stacked in an upper-and-lower manner in each of the trenches, and the driving electric field applied to one of the trenches renders both the first electrically switchable optical structure and the second electrically switchable optical structure in the one of the trenches light-transmissive.

According to an embodiment of the invention, the electrically switchable optical structure includes a first electrically switchable optical structure and a second electrically switchable optical structure that are stacked in an upper-and-lower manner in each of the trenches, a first driving electric field is applied to a first part of the trenches and a second driving electric field is applied to a second part of the trenches, so that the first electrically switchable optical structure and the second electrically switchable optical structure in the first part of the trenches are both rendered light-transmissive, and that one of the first electrically switchable optical structure and the second electrically switchable optical structure in the second part of the trenches is rendered light-transmissive and the other rendered opaque, wherein the first driving electric field is different from the second driving electric field.

An alternative embodiment of the invention provides a privacy apparatus including a light-transmissive layer, a plurality of electrically switchable optical structures, a first electrode layer and a second electrode layer. The light-transmissive layer includes a plurality of trenches not crossing over each other, wherein on a plane of the privacy apparatus, an extension direction of each of the trenches is inclined relative to an edge of the privacy apparatus. The electrically switchable optical structures are respectively disposed in the trenches. The first electrode layer is disposed on a first side of the light-transmissive layer and includes a plurality of first electrodes separated from each other. The second electrode layer is disposed on a second side of the light-transmissive layer and includes a plurality of second electrodes separated from each other. The electrically switchable optical structures are respectively located between the first electrodes and the second electrodes.

According to an embodiment of the invention, the trenches have at least one inclination angle relative to the edge of the privacy apparatus, and the inclination angle is greater than or equal to 30 degrees and smaller than or equal to 75 degrees.

According to an embodiment of the invention, the extension directions of at least two of the trenches are inclined at different inclination angles relative to the edge of the privacy apparatus on the plane of the privacy apparatus.

According to an embodiment of the invention, each of the plurality of trenches comprises a first section and a second section that are connected to each other at their ends, and the extension direction of the first section is different from the extension direction of the second section.

According to an embodiment of the invention, the extension directions of the first sections of two adjacent trenches on the plane of the privacy apparatus are inclined at different inclination angles relative to the edge of the privacy apparatus.

Based on the above, the driving method of the privacy apparatus of the invention is applying the driving electric field to a part of the trenches to render a part of the electrically switchable optical structures light-transmissive, and maintaining the other part of the electrically switchable optical structures opaque. Therefore, the interval between the light-shielding trenches in the privacy apparatus can be adjusted or changed without a need to replace the privacy apparatus, and the invention is applicable to displays of different specifications. In some embodiments of the invention, the first electrically switchable optical structure and the second electrically switchable optical structure that are stacked in an upper-and-lower manner are disposed in the same trench. Therefore, in the privacy apparatus of some embodiments of the invention, by changing the light-transmissive state of the first electrically switchable optical structure and the second electrically switchable optical structure that are stacked in an upper-and-lower manner, the privacy angle can be adjusted.

To make the above features and advantages of the invention more comprehensible, embodiments accompanied with drawings are described in detail as follows.

DETAILED DESCRIPTION OF DISCLOSED EMBODIMENTS

Figure 1A:
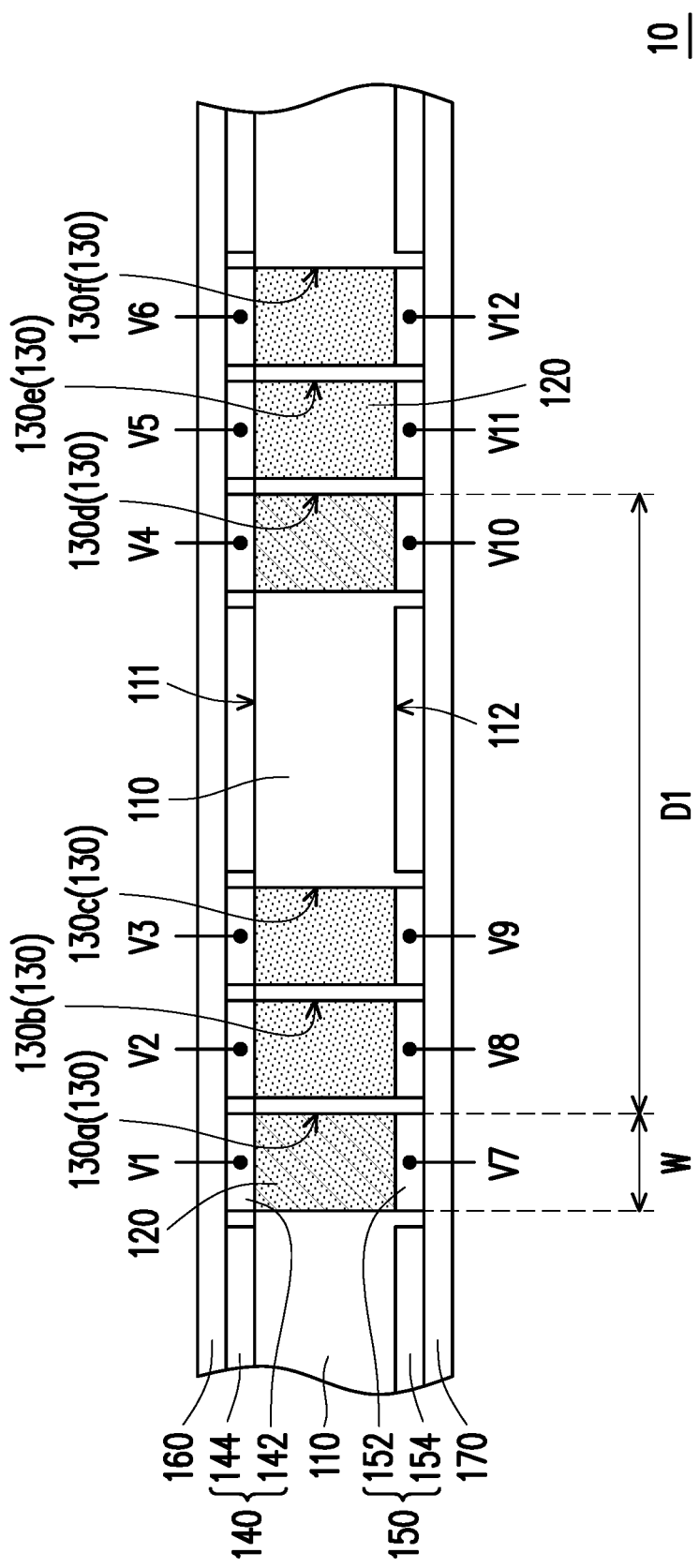
FIG. 1A is a schematic cross-sectional view of a privacy apparatus in a first mode according to an embodiment of the invention.
Figure 1B:
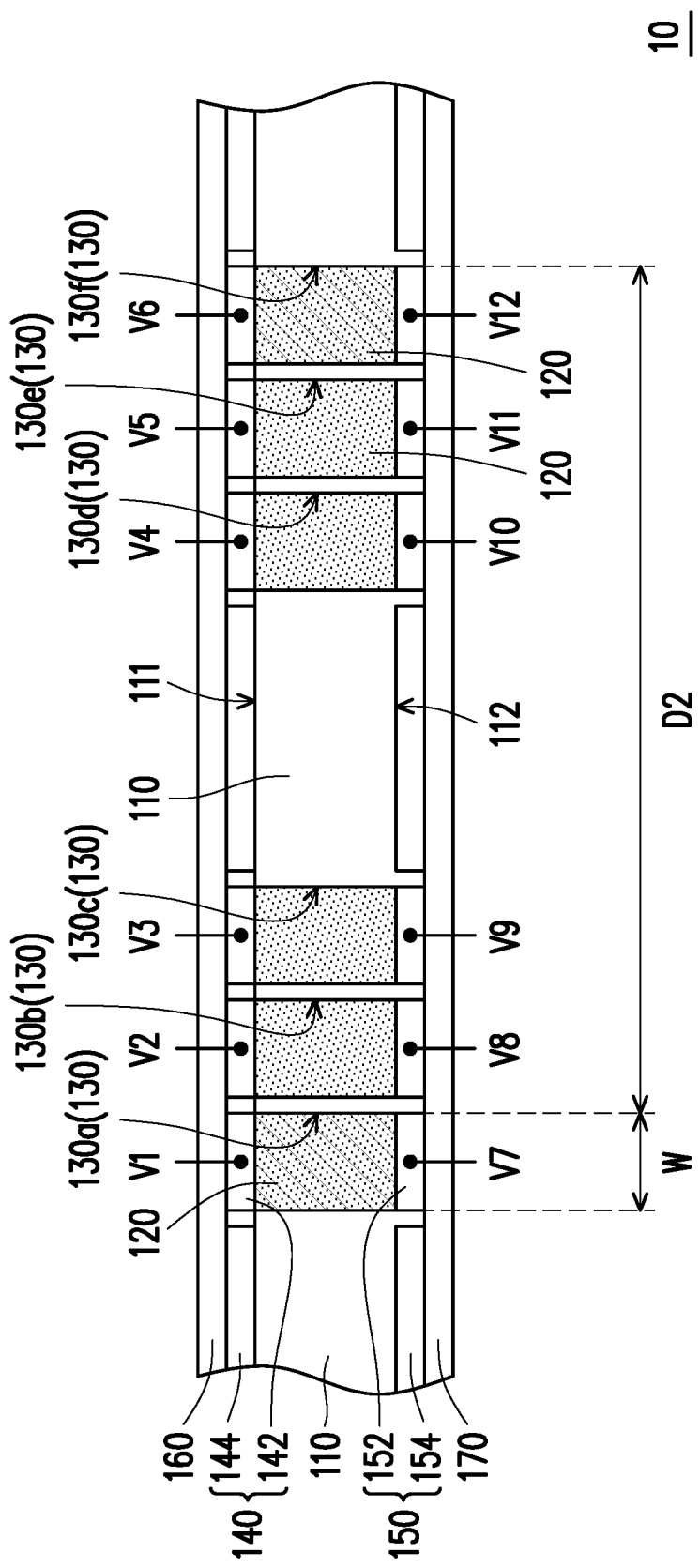
FIG. 1B is a schematic cross-sectional view of a privacy apparatus in a second mode according to another embodiment of the invention.

FIG. 1A is a schematic cross-sectional view of a privacy apparatus in a first mode according to an embodiment of the invention. FIG. 1B is a schematic cross-sectional view of a privacy apparatus in a second mode according to another embodiment of the invention. Referring to FIG. 1A and FIG. 1B, a privacy apparatus 10 includes a light-transmissive layer 110 and a plurality of electrically switchable optical structures 120. The light-transmissive layer 110 includes a plurality of trenches 130, and the electrically switchable optical structures 120 are respectively disposed in the trenches 130. FIG. 1A and FIG. 1B only illustrate cross-sectional views. However, as seen in a top view of the privacy apparatus 10, the trenches 130 may each be, for example, a strip-shaped trench 130, each of the electrically switchable optical structures 120 may have a strip-shaped structure, and the trenches 130 do not cross over each other.

The electrically switchable optical structure 120 is composed of, for example, an electrically switchable optical material. Such electrically switchable optical material may be a liquid crystal material such as polymer dispersed liquid crystal (PDLC). Therefore, optical characteristics of the electrically switchable optical structure 120 may change under a specific driving electric field. For example, the electrically switchable optical structure 120 may change from being light-shielding opaque to being light-transmissive under a certain electric field. By switching the optical characteristics of the electrically switchable optical structure 120, a privacy function of the privacy apparatus 10 is made available or unavailable. In addition, in all the embodiments mentioned herein, by adding a pigment, a dye or a colorant and so on, a part of the electrically switchable optical structures 120 can be of a first color when in the opaque state, and the other part of the electrically switchable optical structures 120 can be of a second color when in the opaque state, wherein the first color is different from the second color. Accordingly, although a display screen is not clear when viewed by a user from a side viewing angle, a specific pattern composed of the first color and the second color can be seen.

In the present embodiment, the privacy apparatus 10 further includes a first electrode layer 140, a second electrode layer 150, a first substrate 160 and a second substrate 170. The electrically switchable optical structure 120 is disposed between the first substrate 160 and the second substrate 170. The first electrode layer 140 is disposed on a first side 111 of the light-transmissive layer 110, located between the electrically switchable optical structure 120 and the first substrate 160 and including a plurality of first electrodes 142 separated from each other. The second electrode layer 150 is disposed on a second side 112 of the light-transmissive layer 110, located between the electrically switchable optical structure 120 and the second substrate 170 and including a plurality of second electrodes 152 separated from each other. In addition, the first electrode layer 140 and the second electrode layer 150 further include compensation electrodes 144 and 154 that are disposed where the light-transmissive layer 110 is located and outside the trenches 130. In other words, both the first electrode layer 140 and the second electrode layer 150 roughly fully covers the whole area of the privacy apparatus 10. When all the electrically switchable optical structures 120 of the privacy apparatus 10 are switched to the light-transmissive state, the light transmittance of the privacy apparatus 10 is roughly uniform over the whole area, thus avoiding visual nonuniformity caused by the distribution of electrode materials.

In the present embodiment, a required voltage signal may be applied to the first electrode 142 and the second electrode 152, so as to generate a required driving electric field in the corresponding trench 130. In addition, the voltage signal to be applied to the first electrode 142 and the second electrode 152 may be determined upon characteristics of the electrically switchable optical structure 120. In some embodiments, an AC (alternating current) voltage signal may be applied to at least one of the first electrode 142 and the second electrode 152. For example, the voltage applied to at least one of the first electrode 142 and the second electrode 152 may be an AC voltage having a frequency of 8.3 ms (micro seconds) to 16.67 ms. However, the invention is not limited thereto. In other alternative embodiments, a DC (direct current) voltage signal may be applied to the first electrode 142 and the second electrode 152.

A driving method of the privacy apparatus 10 includes applying a driving electric field to a part of the trenches 130 to render a part of the electrically switchable optical structures 120 light-transmissive, and maintaining the other part of the electrically switchable optical structures 120 opaque. Referring to FIG. 1A, the driving electric field applied to the trenches 130b, 130c, 130e and 130f renders the electrically switchable optical structures 120 disposed in the trenches 130b, 130c, 130e and 130f light-transmissive. Meanwhile, the first electrode 142 and the second electrode 152 respectively on both sides of the trenches 130a and 130d may be electrically grounded, so that the electrically switchable optical structures 120 disposed in the trenches 130a and 130d are maintained opaque. Therefore, in the first mode, the trenches 130a and 130d in which the electrically switchable optical structures 120 are opaque are separated from each other by a first interval D1. Herein, the interval refers to a distance measured from the right edge of the trench of one of the opaque electrically switchable optical structures 120 to the right edge of the trench of the next opaque electrically switchable optical structure 120. In other embodiments, the interval may also refer to a distance between the centers of the trenches of two adjacent opaque electrically switchable optical structures 120, or a distance between the left edges of the trenches.

In the present embodiment, voltages V1, V2, V3, V4, V5 and V6 are respectively applied to the first electrodes 142 of the trenches 130a, 130b, 130c, 130d, 130e and 130f. Voltages V7, V8, V9, V10, V11 and V12 are respectively applied to the second electrodes 152 of the trenches 130a, 130b, 130c, 130d, 130e and 130f. To render the electrically switchable optical structures 120 in the trenches 130b, 130c, 130e and 130f light-transmissive, a voltage difference between the voltages V2 and V8, a voltage difference between the voltages V3 and V9, a voltage difference between the voltages V5 and V11 and a voltage difference between the voltages V6 and V12 may be greater than a threshold value capable of rendering the electrically switchable optical structure 120 light-transmissive. For example, in the trench 130b, if a driving electric field capable of rendering the electrically switchable optical structure 120 light-transmissive is generated by a voltage difference of 20 V (voltage), one of the voltage V2 and the voltage V8 may be an AC voltage having an amplitude of 20 V, and the other may be 0 V or ground. In addition, a voltage difference between the voltages V1 and V7 and a voltage difference between the voltages V4 and V10 must be smaller than the threshold value capable of rendering the electrically switchable optical structure 120 light-transmissive. Alternatively, the voltages V1, V7, V4 and V10 may all be 0 V or ground, so that the electrically switchable optical structures 120 disposed in the trenches 130a and 130d are maintained opaque. However, the invention is not limited thereto.

In the second mode, as shown in FIG. 1B, the driving electric field is applied to the trenches 130b, 130c, 130d and 130e to render the electrically switchable optical structures 120 disposed in the trenches 130b, 130c, 130d and 130e light-transmissive, and the electrically switchable optical structures 120 disposed in the trenches 130a and 130f are maintained opaque. Thus, in the second mode, the opaque electrically switchable optical structures 120 disposed in the trenches 130a and 130f are separated from each other by a second interval D2.

It is clear from FIG. 1A and FIG. 1B that the first interval D1 is different from the second interval D2. That is, by adjusting the applied driving electric field, different privacy pitches (namely, intervals between the opaque electrically switchable optical structures 120) can be obtained. In some embodiments, the first interval D1 and the second interval D2 are, for example, greater than or equal to 150 um and smaller than or equal to 450 um. A width W of the trench 130 is, for example, greater than or equal to 1 um and smaller than or equal to 7 um. However, the invention is not limited thereto. The user may properly adjust the privacy pitch of the privacy apparatus 10 according to a display equipped with the privacy apparatus 10 to prevent moiré from appearing on the display screen and affecting display quality.

Figure 2:
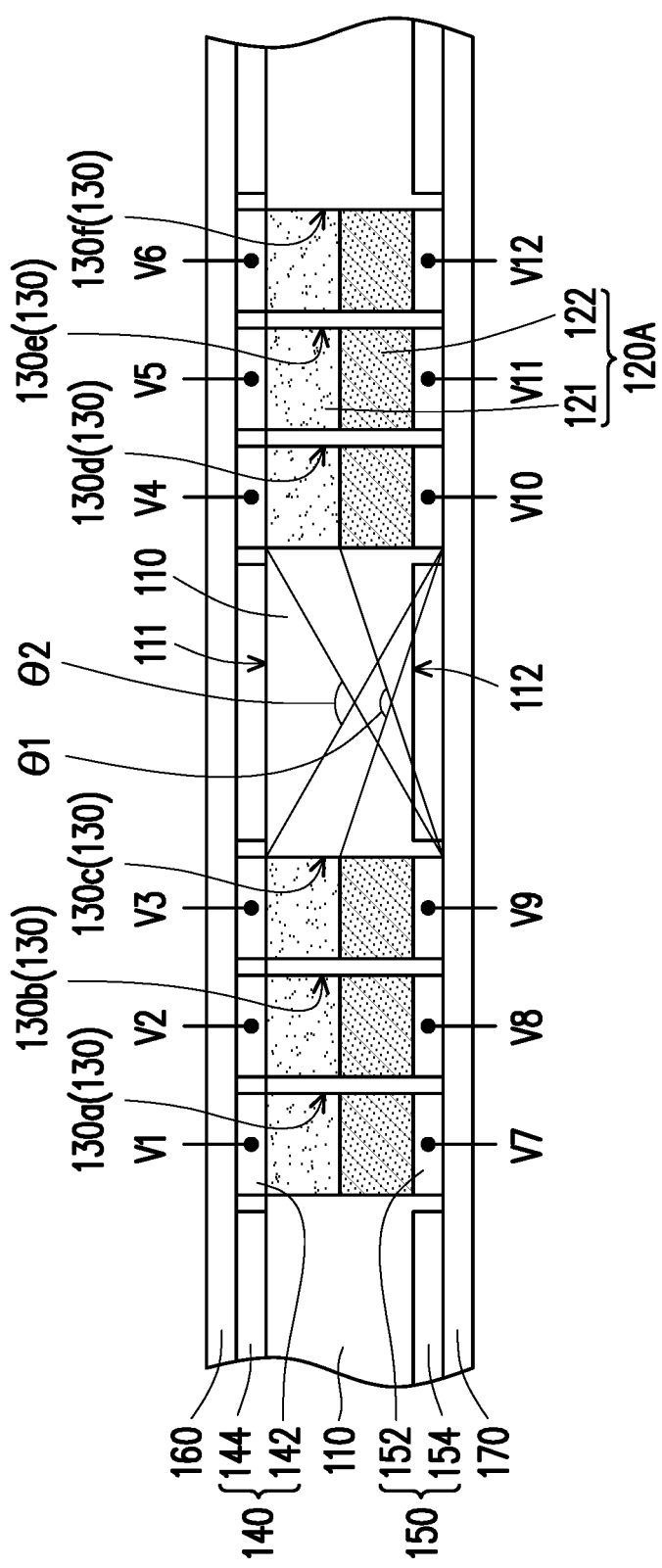
FIG. 2 is a schematic cross-sectional view of a privacy apparatus according to an embodiment of the invention.

FIG. 2 is a schematic cross-sectional view of a privacy apparatus in a driving mode according to an embodiment of the invention. Referring to FIG. 2, a privacy apparatus 10A is similar to the privacy apparatus 10, and includes the light-transmissive layer 110 and a plurality of electrically switchable optical structures 120A. Specifically, the light-transmissive layer 110 includes a plurality of trenches 130, and the electrically switchable optical structures 120A are respectively disposed in the trenches 130. The electrically switchable optical structure 120A includes a first electrically switchable optical structure 121 and a second electrically switchable optical structure 122 that are stacked in an upper-and-lower manner in each of the trenches 130. In the present embodiment, by selecting materials and compositions thereof, the first electrically switchable optical structure 121 and the second electrically switchable optical structure 122 can be rendered light-transmissive under different driving electric fields. Therefore, the first electrically switchable optical structure 121 and the second electrically switchable optical structure 122 in the same trench 130 may both be opaque or both be light-transmissive, and it is also possible that one of them becomes light-transmissive and the other is maintained opaque.

In an embodiment, a material of the first electrically switchable optical structure 121 may include a low voltage type polymer dispersed liquid crystal (PDLC) material, and a material of the second electrically switchable optical structure 122 may include a high voltage type polymer dispersed liquid crystal material. In an embodiment, the driving electric field (e.g., a voltage difference between the first electrode 142 and the second electrode 152) applied to the trenches 130a, 130b, 130c, 130d, 130e and 130f is greater than the driving electric field under which the first electrically switchable optical structure 121 may become light-transmissive and smaller than the driving electric field under which the second electrically switchable optical structure 122 may become light-transmissive. Under such driving electric field, in each of the trenches 130, the first electrically switchable optical structure 121 becomes light-transmissive and the second electrically switchable optical structure 122 is maintained opaque. Thus, the privacy apparatus 10A has a viewing angle θ1 at this moment.

If the first electrically switchable optical structure 121 and the second electrically switchable optical structure 122 disposed in the trenches 130a, 130b, 130c, 130d, 130e and 130f are both maintained opaque, the privacy apparatus 10A has a viewing angle θ2, and the viewing angle θ2 is smaller than the viewing angle θ1. Therefore, in the present embodiment, by adjusting the driving electric field, the first electrically switchable optical structure 121 and the second electrically switchable optical structure 122 stacked in an upper-and-lower manner in the trench 130 can be rendered light-transmissive or be maintained opaque, thereby switching the size of the viewing angle of the privacy apparatus 10A.

Figure 3:
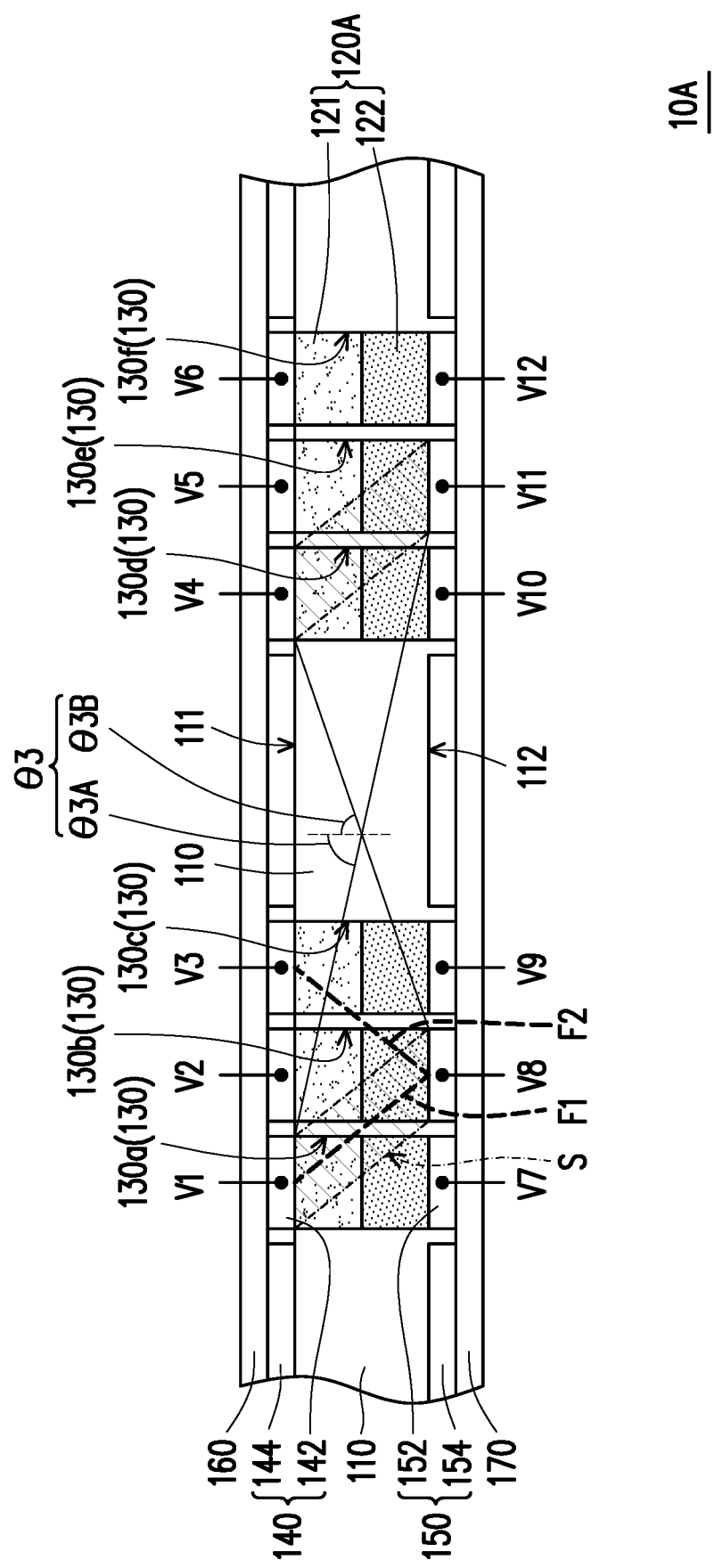
FIG. 3 is a schematic cross-sectional view of a privacy apparatus according to an embodiment of the invention.

FIG. 3 is a schematic cross-sectional view of a privacy apparatus in a driving mode according to an embodiment of the invention. Referring to FIG. 3, the structural design and constituent members of the privacy apparatus 10A may be understood with reference to relevant descriptions of the embodiment of FIG. 2, and will be omitted herein. In the embodiment of FIG. 3, the driving electric field applied to each of the trenches 130 is different from that of the embodiment of FIG. 2. As shown in FIG. 3, the driving mode of the present embodiment includes, for example, applying a first driving electric field to the trenches 130c and 130f, and applying a driving electric field different from the first driving electric field to the trenches 130a, 130b, 130d and 130e. The first driving electric field is greater than the driving electric field under which the first electrically switchable optical structure 121 and the second electrically switchable optical structure 122 are changed into the light-transmissive state. Therefore, the first driving electric field renders both the first electrically switchable optical structure 121 and the second electrically switchable optical structure 122 disposed in the trenches 130c and 130f light-transmissive. The driving electric field applied to the trenches 130a, 130b, 130d and 130e renders the first electrically switchable optical structure 121 and the second electrically switchable optical structure 122 within a specific region S opaque, and renders the first electrically switchable optical structure 121 and the second electrically switchable optical structure 122 disposed outside the specific region S in the trenches 130a, 130b, 130d and 130e light-transmissive, or more light-transmissive than within the specific region S.

In the present embodiment, the voltage difference (namely the driving electric field) between the voltages V3 and V9 and the voltage difference between the voltages V6 and V12 are, for example, greater than the voltage difference required for changing the first electrically switchable optical structure 121 and the second electrically switchable optical structure 122 into the light-transmissive state. In addition, the voltages V1, V4, V8 and V11 respectively applied to the trenches 130a, 130b, 130d and 130e are, for example, 0 V or ground, and the voltages V2, V5, V7 and V10 are, for example, floating. However, the invention is not limited thereto.

In such driving mode, a connecting line F1 between the first electrode 142 of the trench 130a and the second electrode 152 of the trench 130b is roughly an equipotential line of 0 V or ground voltage, and a connecting line F2 between the second electrode 152 of the trench 130b and the first electrode 142 of the trench 130c may roughly represent an electrical field having a voltage difference of 20 V. Therefore, the distribution of the opaque specific region S is roughly along the connecting line F1. At this moment, the privacy apparatus 10A has a viewing angle θ3 deviating toward one side when performing the privacy function in the driving manner shown in FIG. 3. For example, a viewing angle θ3A of the privacy apparatus 10A on one side is greater than a viewing angle θ3B thereof on the other side. In other embodiments, the same or similar methods may be used to cause the privacy apparatus 10A to have a viewing angle deviating toward the other side. Details thereof are omitted herein. Therefore, when the double layer electrically switchable optical structure 120A is disposed in the trench 130, the direction of a privacy viewing angle of the privacy apparatus 10A can be adjusted by the above method.

Figure 4:
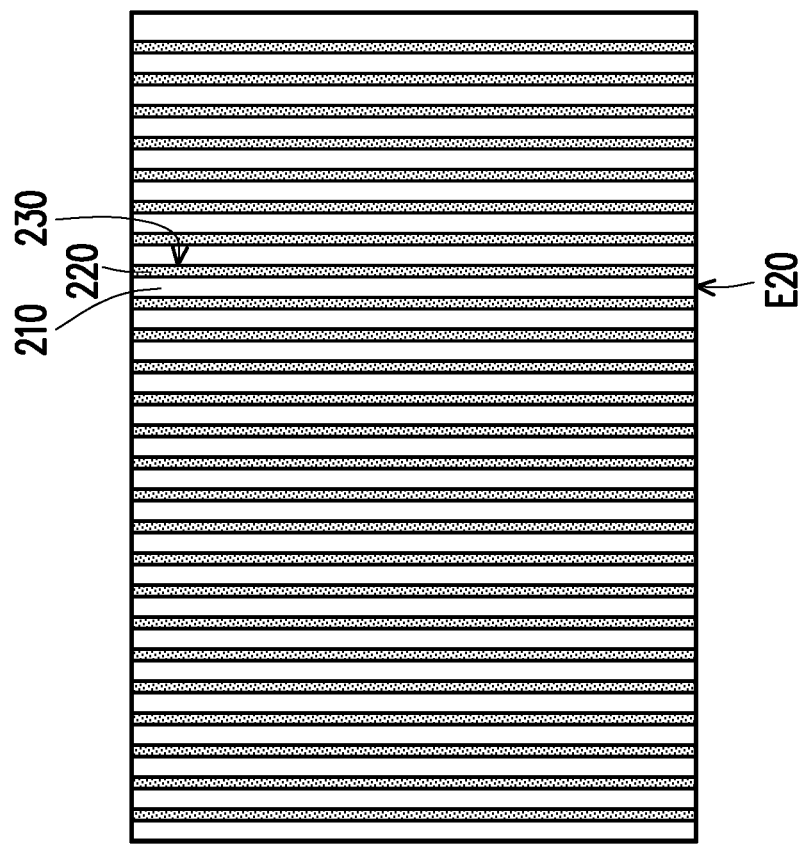
FIG. 4 is a schematic top view of a privacy apparatus according to an embodiment of the invention.

FIG. 4 is a schematic top view of a privacy apparatus according to an embodiment of the invention. Referring to FIG. 4, a privacy apparatus 20 includes a light-transmissive layer 210 and a plurality of electrically switchable optical structures 220. The light-transmissive layer 210 includes a plurality of trenches 230, and the electrically switchable optical structures 220 are respectively disposed in the trenches 230. On a plane of the rectangular privacy apparatus 20, the trenches 230 are parallel to each other and an extension direction of each of the trenches 230 is perpendicular to one edge E20 of the privacy apparatus 20. However, the invention is not limited thereto. In addition, although the trenches 230 are arranged at equal intervals in FIG. 4, they may be arranged at non-equal intervals in other embodiments.

In the present embodiment, in each of the trenches 230, the electrically switchable optical structures 220 (having a structural design as shown in FIG. 2 and FIG. 3 in cross-section) stacked in an upper-and-lower manner may be disposed, and the privacy apparatus 20 may be driven using the driving method described in FIG. 1A and FIG. 1B or the driving method described in FIG. 2 or FIG. 3. That is, the electrically switchable optical structures 220 in different trenches 230 can be independently driven to be light-transmissive or be opaque. Depending on different desired privacy effects, the privacy apparatus 20 may render the electrically switchable optical structures 220 in each of the trenches 230 opaque and having a first pitch in a first mode, and may render the electrically switchable optical structures 220 in only a part of the trenches 230 opaque and having a second pitch in a second mode. To realize the desired privacy effect, it is even possible to render one of the upper and lower stacked electrically switchable optical structures 220 in the same trench 230 opaque and the other light-transmissive. Of course, the upper and lower stacked electrically switchable optical structures 220 in the same trench 230 may both be opaque or both be light-transmissive at the same time.

Figure 5A:
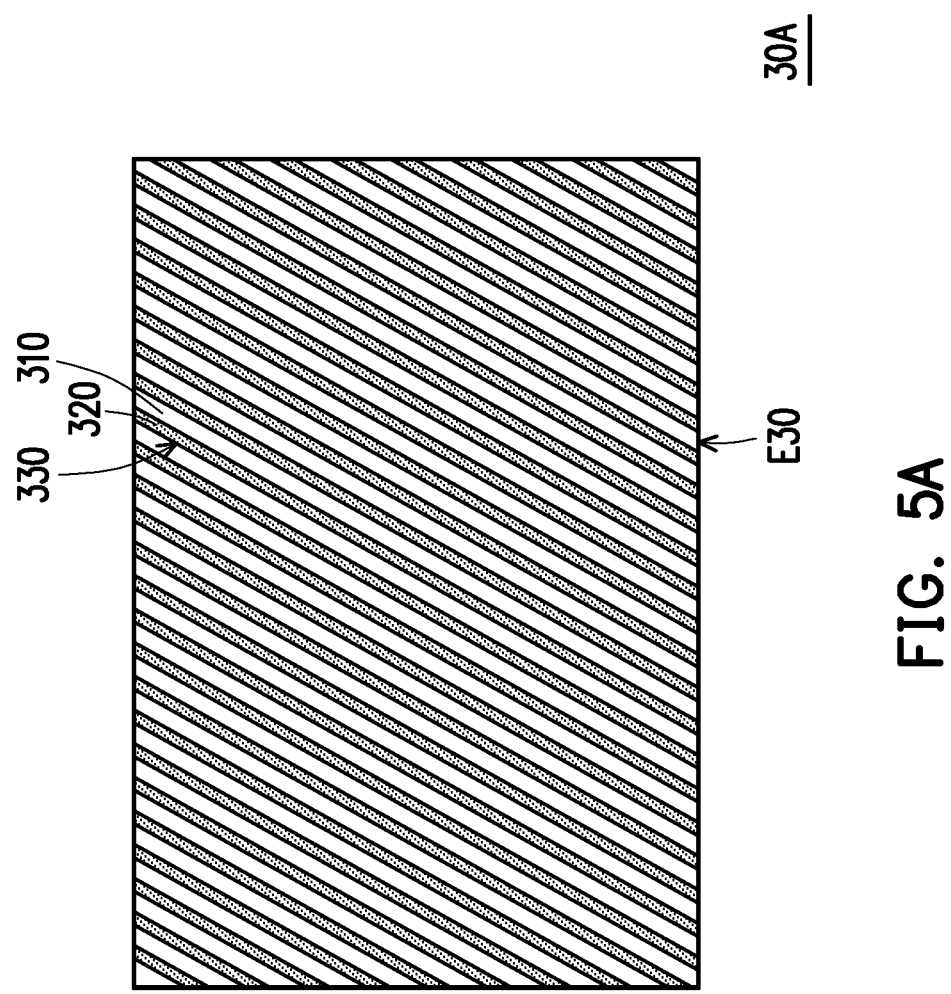
FIG. 5A to FIG. 5C are schematic top views of privacy apparatuses according to different embodiments of the invention.
Figure 5B:
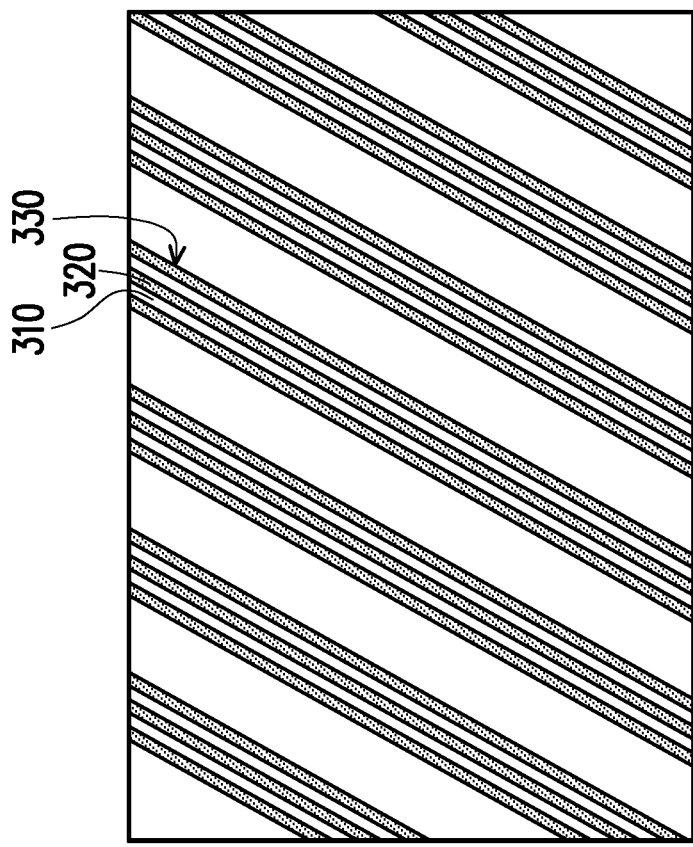
Figure 5C:
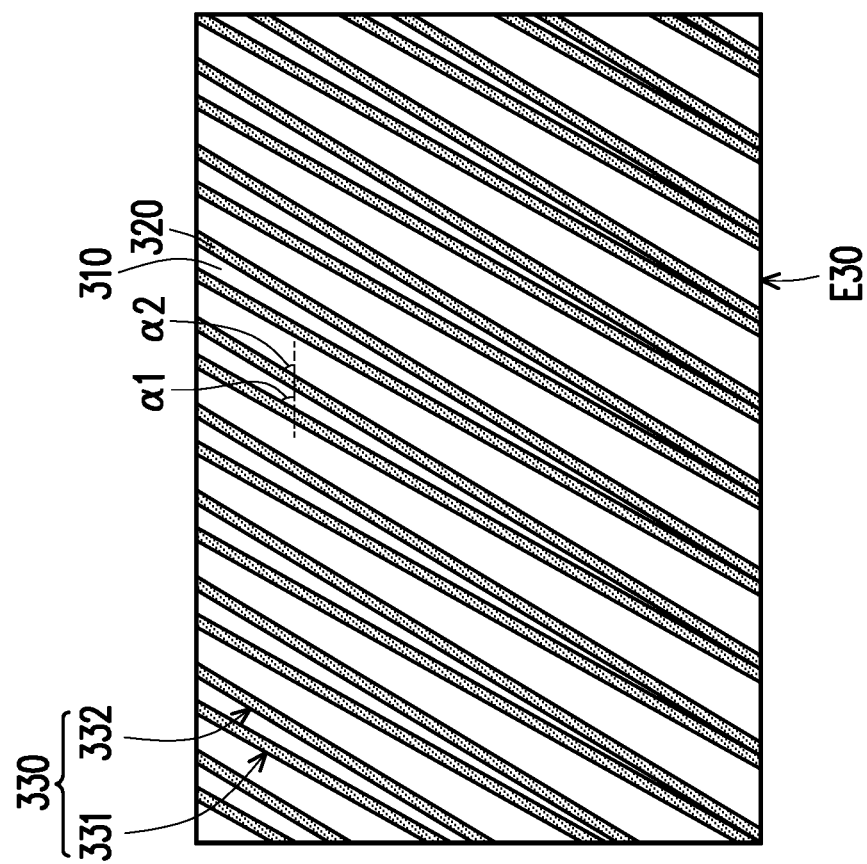

FIG. 5A to FIG. 5C are schematic top views of privacy apparatuses according to other embodiments of the invention. Referring to FIG. 5A, a privacy apparatus 30A is roughly similar to the privacy apparatus 20, and the difference between the two mainly lies in the direction of the trench. In the present embodiment, the privacy apparatus 30A includes a light-transmissive layer 310 and a plurality of electrically switchable optical structures 320. The light-transmissive layer 310 includes a plurality of trenches 330, and the electrically switchable optical structures 320 are respectively disposed in the trenches 330. Specifically, on a plane of the privacy apparatus 30A, the trenches 330 are parallel to each other and an extension direction of each of the trenches 330 is inclined relative to one edge E30 of the privacy apparatus 30A. In the present embodiment, in each of the trenches 330, the electrically switchable optical structures 320 (having a structural design as shown in FIG. 2 and FIG. 3 in cross-section) stacked in an upper-and-lower manner may be disposed, and the privacy apparatus 30A may be driven using the driving method described in FIG. 1A and FIG. 1B or the driving method described in FIG. 2 or FIG. 3.

Referring to FIG. 5B, a privacy apparatus 30B is roughly similar to the privacy apparatus 30A, but the trenches 330 of the privacy apparatus 30B are arranged at non-equal intervals. In addition, in each of the trenches 330 of the privacy apparatus 30B, only one single electrically switchable optical structure 320 (having a structural design as shown in FIG. 1A and FIG. 1B in cross-section) may be disposed or the electrically switchable optical structures 320 (having a structural design as shown in FIG. 2 and FIG. 3 in cross-section) stacked in an upper-and-lower manner may be disposed. Moreover, the privacy apparatus 30B may be driven using the driving method described in FIG. 1A and FIG. 1B or the driving method described in FIG. 2 or FIG. 3.

Referring to FIG. 5C, a privacy apparatus 30C is roughly similar to the privacy apparatus 30A. Specifically, the trench 330 of the light-transmissive layer 310 of the privacy apparatus 30C includes a first trench 331 and a second trench 332, and the electrically switchable optical structures 320 are respectively disposed in the first trenches 331 and the second trenches 332. On a plane of the privacy apparatus 30C, an extension direction of the first trench 331 is inclined at a first inclination angle α1 relative to the edge E30 of the privacy apparatus 30C, and an extension direction of the second trench 332 is inclined at a second inclination angle α2 relative to the edge E30 of the privacy apparatus 30C, wherein the first inclination angle α1 is different from the second inclination angle α2. The first trench 331 and the second trench 332 may intersect each other but do not cross over each other. In each of the trenches 330, one single electrically switchable optical structure 320 (having a structural design as shown in FIG. 1A and FIG. 1B in cross-section) may be disposed or two electrically switchable optical structures 320 (having a structural design as shown in FIG. 2 and FIG. 3 in cross-section) stacked in an upper-and-lower manner may be disposed.

In the present embodiment, the first inclination angle α1 and the second inclination angle α2 are, for example, greater than or equal to 30 degrees and smaller than or equal to 75 degrees. An angle difference Δα between the first inclination angle α1 and the second inclination angle α2 is, for example, greater than or equal to 1 degree and smaller than or equal to 6 degrees. However, the invention is not limited thereto. In addition, the first trenches 331 are parallel to each other and may be arranged at equal intervals or non-equal intervals. The second trenches 332 are parallel to each other and may be arranged at equal intervals or non-equal intervals. The interval between the first trenches 331 may be equal to the interval between the second trenches 332. In other embodiments, the trench 330 in the privacy apparatus 30C may be inclined at three or more different angles relative to the edge E30 of the privacy apparatus 30C.

The privacy apparatus 30C may be driven using the driving method described in FIG. 1A and FIG. 1B. For example, the electrically switchable optical structures in the trenches 330 having the same inclination angle may be opaque while the electrically switchable optical structures in the other trenches 330 having different inclination angles are rendered light-transmissive, thereby realizing the desired privacy effect. In some embodiments, it is also possible to render all the electrically switchable optical structures in the trenches 330 having different inclination angles opaque. In addition, the privacy apparatus 30C may also be driven using the driving method described in FIG. 2 or FIG. 3, so as to provide the desired privacy viewing angle.

Figure 6A:
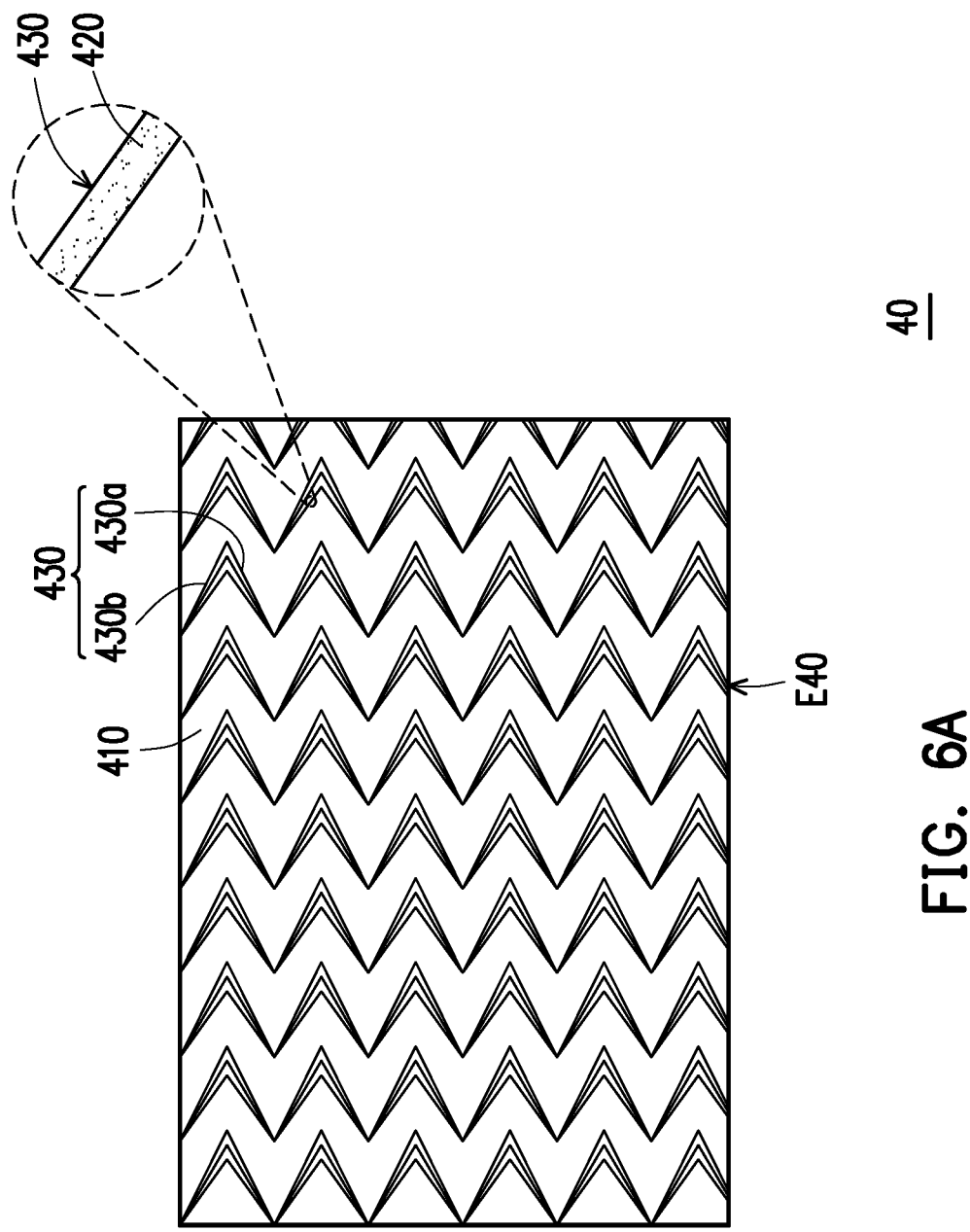
FIG. 6A is a schematic top view of a privacy apparatus according to still another embodiment of the invention.

FIG. 6A is a schematic top view of a privacy apparatus according to still another embodiment of the invention. Referring to FIG. 6A, a privacy apparatus 40 includes a light-transmissive layer 410 and a plurality of electrically switchable optical structures 420. The light-transmissive layer 410 includes a plurality of trenches 430, and the electrically switchable optical structures 420 are respectively disposed in the trenches 430. Specifically, each of the trenches 430 includes a first section 430a and a second section 430b. The first section 430a and the second section 430b are connected to each other at their ends. Moreover, on a plane of the privacy apparatus 40, an extension direction of the first section 430a is different from an extension direction of the second section 430b. That is, each of the trenches 430 has a bent structure formed by alternately connecting the first section 430a and the second section 430b. Herein, for the purposes of explanation, the first section 430a refers to a line segment extending in an upper-right-to-lower-left direction, and the second section 430b refers to a line segment extending in an upper-left-to-lower-right direction.

Figure 6B:
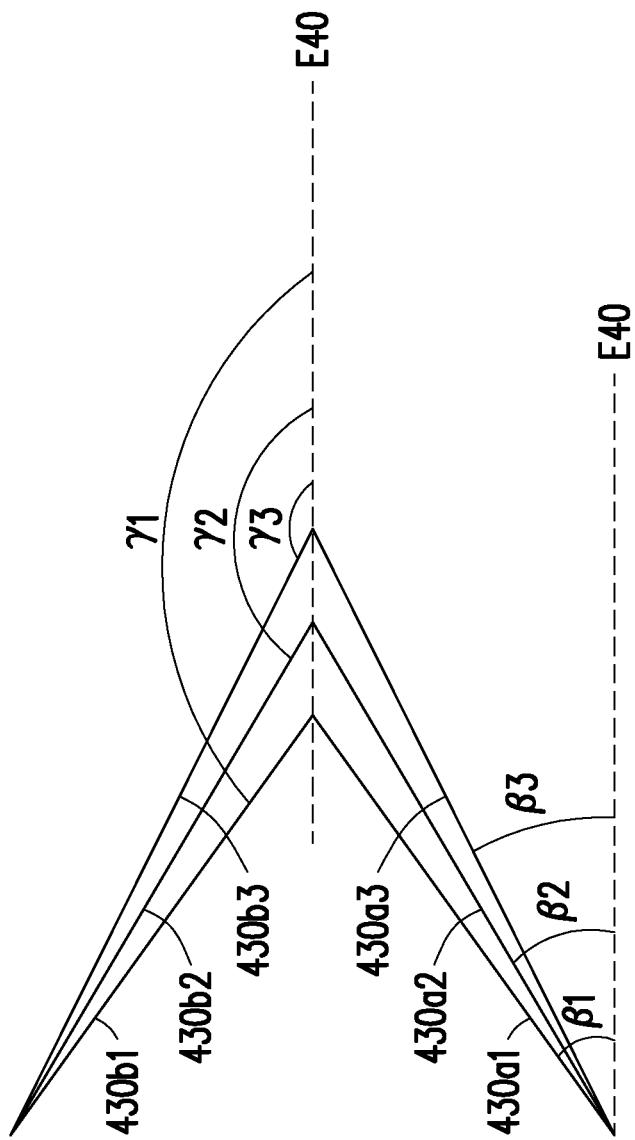
FIG. 6B is a schematic partially enlarged view of the privacy apparatus in FIG. 6A.

In the present embodiment, the privacy apparatus 40 is, for example, a rectangular apparatus. Moreover, the extension directions of the first sections 430a (or the second sections 430b) of adjacent trenches 430 on the plane of the privacy apparatus 40 may be inclined at different inclination angles relative to an edge of the privacy apparatus 40. As shown in FIG. 6B, the extension directions of first sections 430a1, 430a2 and 430a3 of three adjacent trenches 430 on the plane of the privacy apparatus 40 respectively have inclination angles β1, β2 and β3 relative to an edge E40 of the privacy apparatus 40, and the extension directions of second sections 430b1, 430b2 and 430b3 of the three adjacent trenches 430 on the plane of the privacy apparatus 40 respectively have inclination angles γ1, γ2 and γ3 relative to the edge E40 of the privacy apparatus 40. The inclination angles β1, β2 and β3 may each be greater than or equal to 30 degrees and smaller than or equal to 75 degrees. The inclination angles γ1, γ2 and γ3 may each be greater than or equal to 105 degrees and smaller than or equal to 150 degrees. In the present embodiment, an angle difference Δβ between two adjacent ones of the inclination angles β1, β2 and β3 is greater than or equal to 1 degree and smaller than or equal to 6 degrees, and an angle difference Δγ between two adjacent ones of the inclination angles γ1, γ2 and γ3 is greater than or equal to 1 degree and smaller than or equal to 6 degrees. In addition, an angular bisector of an angle between the first section 430a and the second section 430b of the same trench 430 may be parallel to the edge E40 of the privacy apparatus 40. However, the invention is not limited thereto. Herein, for explanation of the relationship between the inclination angles, all the inclination angles are obtained by measuring an angle the extension direction of the trench rotates in the clockwise direction to become parallel to the edge E40. However, the invention is not limited thereto.

In the present embodiment, the inclination direction of the first section 430a of the trench 430 is advantageous for providing the privacy effect in the left-right direction of the drawing, and the inclination direction of the second section 430b of the trench 430 is advantageous for providing the privacy effect in the up-down direction of the drawing. Therefore, the privacy apparatus 40 can provide the privacy effect at top and bottom viewing angles as well as at left and right viewing angles. In addition, in each of the trenches 430, one single electrically switchable optical structure 420 may be disposed, and the privacy apparatus 40 may be driven using the driving method described in FIG. 1A and FIG. 1B. Alternatively, in each of the trenches 430, the electrically switchable optical structures 420 stacked in an upper-and-lower manner may be disposed, and the privacy apparatus 40 may be driven using the driving method described in FIG. 1A and FIG. 1B or the driving method described in FIG. 2 or FIG. 3.

Figure 7A:
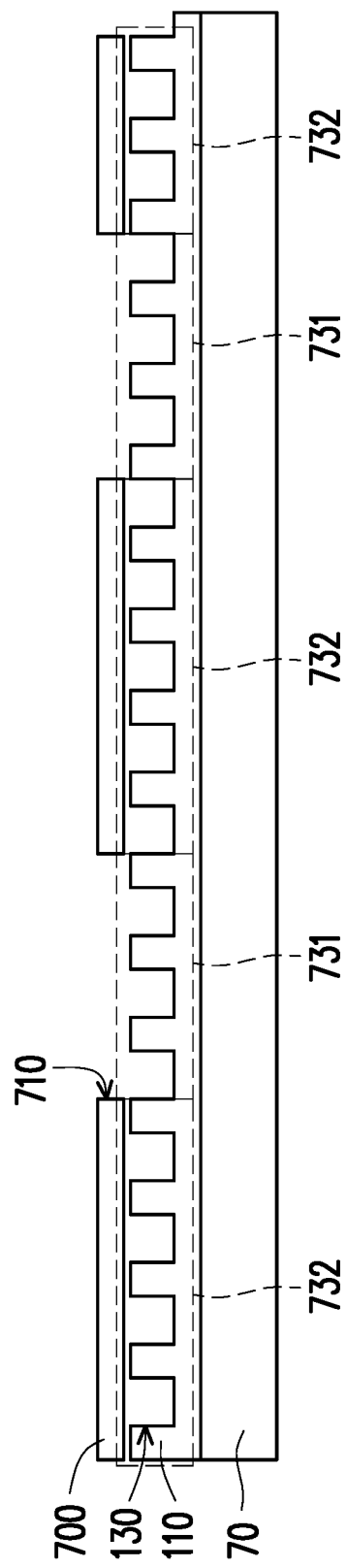
FIG. 7A to FIG. 7C are cross-sectional views showing a manufacturing process of a privacy apparatus according to an embodiment of the invention.
Figure 7B:
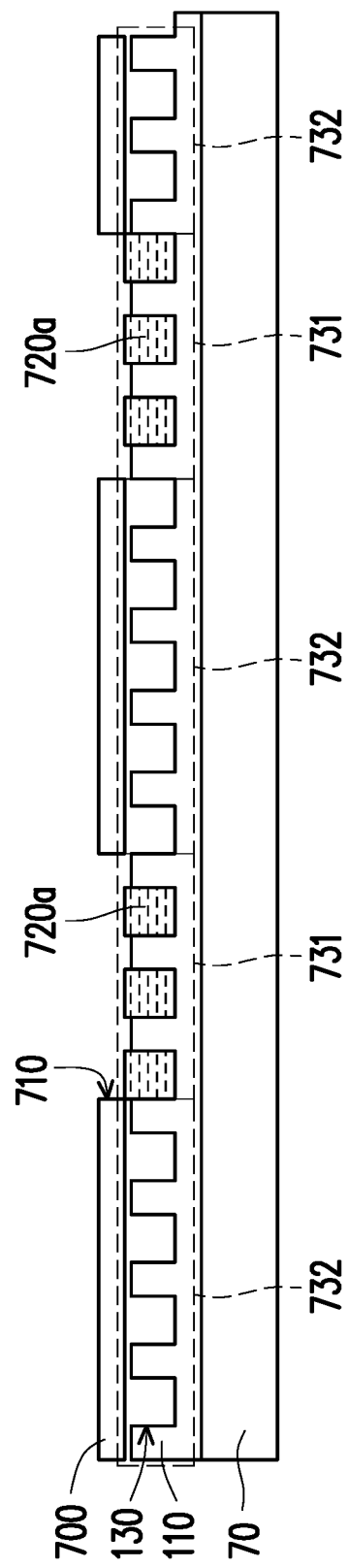
Figure 7C:
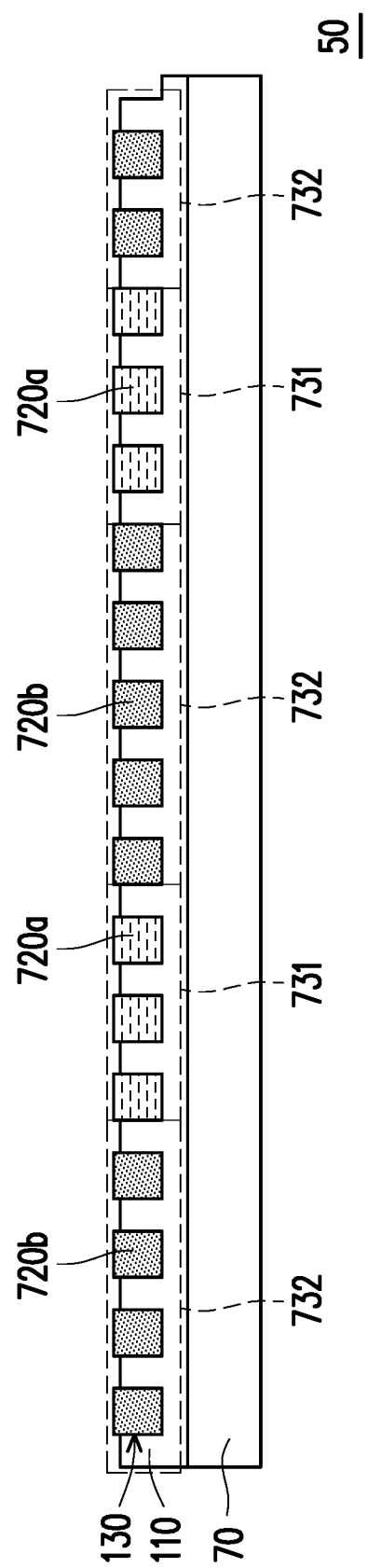

FIG. 7A to FIG. 7C are cross-sectional views showing a manufacturing process of a privacy apparatus according to an embodiment of the invention. Referring to FIG. 7A, the light-transmissive layer 110 is formed on a substrate 70, and the light-transmissive layer 110 includes a plurality of trenches 130 not intersecting each other. A material of the substrate 70 may include polyethylene terephthalate (PET) or polycarbonate (PC). A material of the light-transmissive layer 110 may include a transparent UV curable optical cement. A mask 700 is placed on the light-transmissive layer 110. The mask 700 has at least one opening 710 exposing a first part 731 of the trenches 130, and the mask 700 shields a second part 732 of the trenches 130.

Referring to FIG. 7B, a first electrically switchable optical material 720a is filled into the first part 731 of the trenches 130 exposed by the opening 710 of the mask 700. A method of filling the first electrically switchable optical material 720a may be a coating method, an dropping method or other suitable methods. Herein, the first electrically switchable optical material 720a may include a polymer dispersed liquid crystal (PDLC) material. Before performing the subsequent steps, a curing step may be performed to cure the first electrically switchable optical material 720a in the first part 731 of the trenches 130. A curing method mentioned herein may be determined according to properties of the first electrically switchable optical material 720a, and may be, for example, a light curing method, a thermal curing method, or a combination thereof.

Referring to FIG. 7C, after the mask 700 is removed, a second electrically switchable optical material 720b is filled into the second part 732 of the trenches 130, wherein the second electrically switchable optical material 720b may include a polymer dispersed liquid crystal (PDLC) material. However, the first electrically switchable optical material 720a and the second electrically switchable optical material 720b may contain different pigments, dyes or colorants. Thus, the first electrically switchable optical material 720a and the second electrically switchable optical material 720b are of different colors when in the opaque state or when changed into the light-transmissive state. Next, the second electrically switchable optical material 720b is cured, thereby obtaining a privacy apparatus 50. Since the first electrically switchable optical material 720a and the second electrically switchable optical material 720b are distributed in different regions and are of different colors, when the privacy apparatus 50 performs the privacy function, a pattern presented by the first electrically switchable optical material 720a and the second electrically switchable optical material 720b can be seen by a viewer from an oblique viewing angle. Thus, the privacy apparatus 50 provides the privacy function while presenting a pattern at an oblique viewing angle, by which flexibility of application in products is improved.

In summary, the driving method of the privacy apparatus of the invention is applying the driving electric field to a part of the trenches to render a part of the electrically switchable optical structures light-transmissive, and maintaining the other part of the electrically switchable optical structures opaque. Therefore, the pitch of the privacy apparatus of the invention is adjustable. There is no need for the user to replace privacy apparatuses having specific pitches in order to correspond to pixel periods of displays having different specifications, and occurrence of moiré on the display screen due to the design of the pitch of the privacy apparatus can be prevented. Moreover, in the privacy apparatus of some embodiments of the invention, different trenches are inclined at different angles relative to the edge of the privacy apparatus, which is also advantageous in preventing the occurrence of moiré on the display screen due to the design of the pitch of the privacy apparatus. In addition, in the privacy apparatus of some embodiments of the invention, the electrically switchable optical structures stacked in an upper-and-lower manner are disposed in each trench. Thus, by switching the state of the electrically switchable optical structures in the same trench, the size and direction of the privacy viewing angle can be adjusted. In addition, in the privacy apparatus of some embodiments of the invention, the electrically switchable optical structures of different colors are used, so as to enable the user to view a predetermined pattern from a side viewing angle.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A driving method of a privacy apparatus, wherein the privacy apparatus comprises a light-transmissive layer and a plurality of electrically switchable optical structures, the light-transmissive layer comprises a plurality of trenches not crossing over each other, and the plurality of electrically switchable optical structures are respectively disposed in the plurality of trenches, an extension direction of each of the plurality of trenches is inclined relative to an edge of the privacy apparatus on a plane of the privacy apparatus, and wherein the driving method comprises:

applying a driving electric field to a part of the plurality of trenches to render a part of the plurality of electrically switchable optical structures light-transmissive; and maintaining the other part of the plurality of electrically switchable optical structures opaque.

2. The driving method of the privacy apparatus according to claim 1, wherein in a first mode, the other part of the plurality of electrically switchable optical structures are separated from each other by a first interval, and in a second mode, the other part of the plurality of electrically switchable optical structures are separated from each other by a second interval, wherein the first interval is different from the second interval.

3. The driving method of the privacy apparatus according to claim 1, wherein the plurality of electrically switchable optical structures comprise a first electrically switchable optical structure and a second electrically switchable optical structure that are stacked in an upper-and-lower manner in each of the plurality of trenches, and the driving electric field applied to one of the plurality of trenches renders both the first electrically switchable optical structure and the second electrically switchable optical structure in the one of the plurality of trenches light-transmissive.

4. The driving method of the privacy apparatus according to claim 1, wherein the plurality of electrically switchable optical structures comprise a first electrically switchable optical structure and a second electrically switchable optical structure that are stacked in an upper-and-lower manner in each of the plurality of trenches, a first driving electric field is applied to a first part of the plurality of trenches and a second driving electric field is applied to a second part of the plurality of trenches, so that the first electrically switchable optical structure and the second electrically switchable optical structure in the first part of the plurality of trenches are both rendered light-transmissive, and that one of the first electrically switchable optical structure and the second electrically switchable optical structure in the second part of the plurality of trenches is rendered light-transmissive and the other rendered opaque, wherein the first driving electric field is different from the second driving electric field.

5. A privacy apparatus, comprising:
- a light-transmissive layer comprising a plurality of trenches not crossing over each other, wherein an extension direction of each of the plurality of trenches is inclined relative to an edge of the privacy apparatus on a plane of the privacy apparatus;
- a plurality of electrically switchable optical structures respectively disposed in the plurality of trenches;
- a first electrode layer comprising a plurality of first electrodes separated from each other;
- a second electrode layer comprising a plurality of second electrodes separated from each other, wherein each of the plurality of electrically switchable optical structures is located between one of the plurality of first electrodes and one of the plurality of second electrodes.

6. The privacy apparatus according to claim 5, wherein the plurality of trenches have at least one inclination angle relative to the edge of the privacy apparatus, and the inclination angle is greater than or equal to 30 degrees and smaller than or equal to 75 degrees.

7. The privacy apparatus according to claim 5, wherein the extension directions of at least two of the plurality of trenches are inclined at different inclination angles relative to the edge of the privacy apparatus on the plane of the privacy apparatus.

8. The privacy apparatus according to claim 5, wherein each of the plurality of trenches comprises a first section and a second section that are connected to each other at their ends, and the extension direction of the first section is different from the extension direction of the second section.

9. The privacy apparatus according to claim 8, wherein the extension directions of the first sections of two adjacent trenches on the plane of the privacy apparatus are inclined at different inclination angles relative to the edge of the privacy apparatus.

* * * * *